United States Patent [19]

Nelson

[11] 4,129,984
[45] Dec. 19, 1978

[54] GAS TURBINE ENGINE WITH ANTI-ICING FACILITY

[75] Inventor: Michael E. Nelson, N. Avon, England

[73] Assignee: Rolls-Royce Limited, London, England

[21] Appl. No.: 800,327

[22] Filed: May 25, 1977

[30] Foreign Application Priority Data

Jun. 1, 1976 [GB] United Kingdom ............... 22510/76

[51] Int. Cl.² .......................... F02C 7/04; B04C 11/14
[52] U.S. Cl. ................................ 60/39.09 D; 60/269; 137/15.1; 416/245 R
[58] Field of Search ..................... 60/39.09 B, 39.09 P, 60/269; 137/15.1, 15.2; 416/245 R; 244/134 R, 134 E

[56] References Cited
U.S. PATENT DOCUMENTS

| | | | |
|---|---|---|---|
| 2,540,594 | 2/1951 | Price | 137/15.1 |
| 3,799,475 | 4/1974 | Mitchell et al. | 137/15.1 |
| 3,925,979 | 12/1975 | Ziegler | 244/134 R |

Primary Examiner—Louis J. Casaregola
Attorney, Agent, or Firm—Stevens, Davis, Miller & Mosher

[57] ABSTRACT

The disclosure of this invention pertains to a gas turbine engine with anti-icing facility. The engine has an axial flow compressor having a rotor hub provided at its upstream end with a nose for dividing the air stream into the compressor. The nose has a pointed conical upstream part of limited angle of divergence where ice formation is minimal. The conical part is followed by a toroidally surfaced concave intermediate part defining a transition from the downstream end of the conical part toward the relatively longer diameter of the hub. The increasing angle of divergence of the intermediate part is progressively more prone to ice formation but is also progressively, more able to throw off the ice by centrifugal force. A convex toroidal part forms a surface blending the intermediate part to the hub.

6 Claims, 1 Drawing Figure

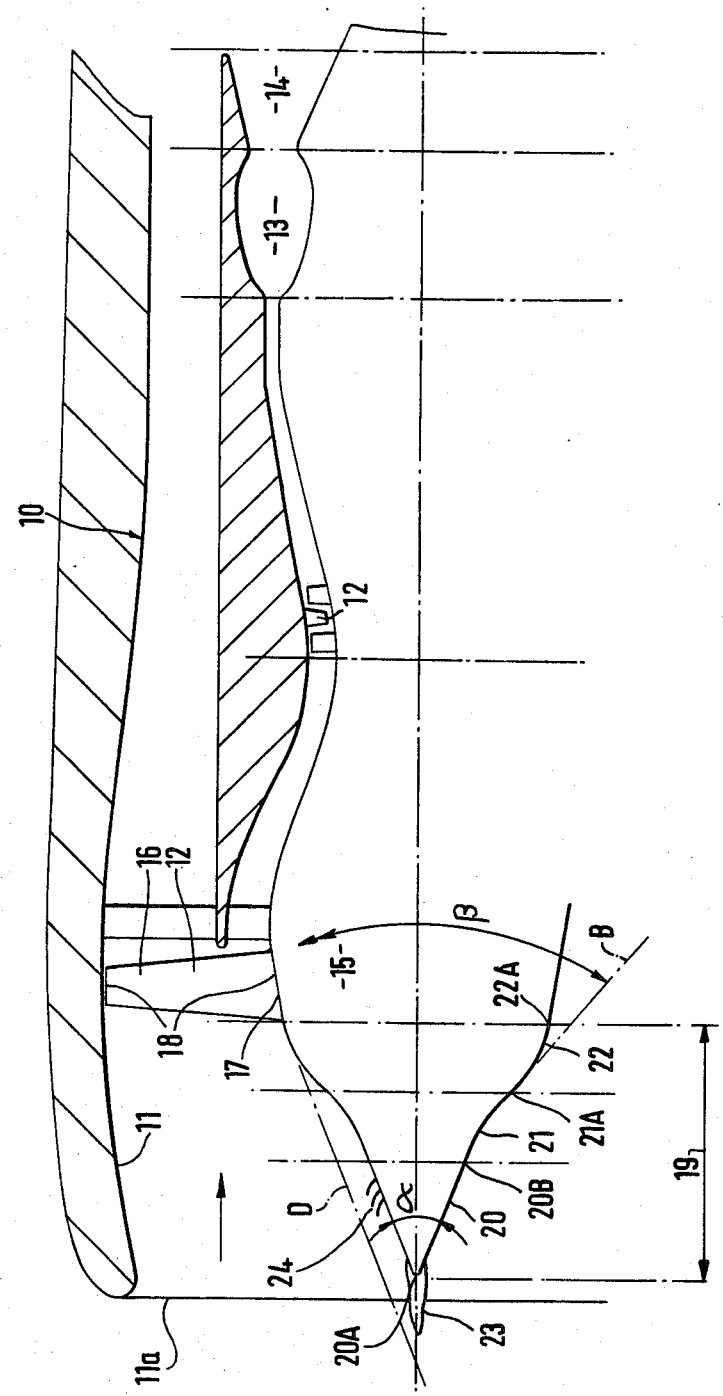

GAS TURBINE ENGINE WITH ANTI-ICING FACILITY

This invention relates to a gas turbine engine having an anti-icing facility.

More specifically, the invention relates to gas turbine engines of the type comprising an axial flow compressor adjoining an air intake and having a rotor hub defining the radially inner surface of the flow path through the compressor, the hub having at the upstream end thereof a nose for dividing a stream of air entering the intake and spreading the said stream radially outwardly toward said hub surface, the nose being secured to said hub and being rotatable therewith.

In engines intended for flight at subsonic speeds the nose is generally of bluff shape. Such a nose is prone to the formation of ice on the more nearly upstream facing parts of its surface, and it has been suggested to give the whole of the nose the shape of a straight-sided cone. However, such a nose is disadvantageous because its axial length is greater than that of a bluff nose with unfavourable consequences in the length and weight of the engine. It is an object of this invention to overcome the above difficulty.

According to this invention an engine of the type described has a nose comprising an upstream part having a conical surface defining a pointed upstream end and a circular downstream end whose diameter is substantially less than that of said hub, the nose further comprising a toroidally-surfaced concave intermediate part contiguous with the upstream end part and a toroidally-surfaced convex downstream part arranged contiguously between the intermediate part and said hub.

The invention is based on the recognition that the conical shape is required only at the upstream part of the nose. At that part the pointed end and a relatively small angle of divergence of the conical shape are hostile to ice formation. However, away from the pointed end of the upstream part it is possible to progressively increase the angle of divergence. Although such an increase favours ice formation, the concomitant increase in diameter improves the tendency of the ice being thrown off by cnetrifugal force. The result of the arrangement is a nose of lesser axial length than a wholly conical nose without a sacrifice in anti-icing properties.

An example of an engine according to the invention will now be described with reference to the accompanying drawing which shows an elevation of the engine.

The engine 10 is shown in relation to an air intake 11 and comprises in flow-series an axial compressor 12, a combustor 13 and a turbine 14 connected to drive the compressor. The compressor has a rotor 15 supporting compressor blades 16 connected to a hub 17 the exterior surface of which defines the radially inner boundary of an air flow passage 18 through the compressor. At its upstream end the hub has secured thereto a nose 19 which rotates together with the compressor. The nose has an upstream part 20 having the shape of a straight-sided cone whose apex is situated at the upstream end of the nose and whose base is joined to an intermediate part 21 which is generally of concave toroidal shape and which in turn adjoins a downstream part 22 which is generally of convex toroidal shape. The intermediate and downstream parts form blending curves between the downstream end of the part 20 and the upstream end of the hub 15, the latter having a diameter which is, in a representative example, approximately three times that of the big end of the part 20.

As regards the formation of ice on the nose it is necessary to consider the different parts of the nose separately. At the extreme tip 20A of the conical part it is usually not possible to avoid the formation of a small forwardly extending column 23 of ice (shown enlarged) having a base extending a short distance upstream along the cone surface of the part 20. Clearly, the sharper the tip 20A the less will be the formation of such an ice column.

Considering now the region of the part 20 away from the immediate vicinity of the tip 20A, here ice tends to form in small flakes 24 (shown enlarged) which extend in overlapping relationship and generally in the upstream direction. Such flakes grow to a certain size and then break off under centrifugal force. The smaller the angle $\alpha$ of the cone surface, the less will be the tendency for such flake formation. On the other hand the further back on the cone surface one goes, the greater is the diameter of the cone and therefore the centrifugal force whereby the flakes are broken off. Therefore there comes a diameter when the angle of divergence of the nose can be increased to bring about a more rapid transition to a larger diameter and thereby avoid an unduly great length for the nose, i.e. to avoid the shape indicated by a line D.

The transition to the larger diameter occurs in the part 21 of the nose. Here a relatively larger angle $\beta$ of divergence is introduced as indicated by a tangent line B. If such an angle were used near the tip 20, it would lead to unacceptably large permanent ice formation on the nose. But since the part 20 is situated on a relatively large diameters, the larger centrifugal force existing at that diameter is capable of breaking the ice flakes off.

Clearly the greater the speed of the engine the smaller may be the diameter at which the part 21 starts, the greater may be the angle of divergence of this part, and the shorter will be the overall length of the nose. Attention must be given to the ability of the engine to injest the flakes as they break off the nose. Thus a robust engine with relatively large blades can accomodate a nose having a part 21 of greater angle of divergence, i.e. an angle at which larger ice flakes tend to be formed.

Clearly there must be a transition from the concave shape of the part 21 to the hub surface 17. This is provided by the part 22 which is merely a matter of blending the surfaces at 21 and 17 by a suitable radius. Little or no ice formation is encountered at the part 22.

The formation of flakes capable of braking off under centrifugal force must be distinguished from permanent ice formations such as the axial column referred to. Naturally, when the icing conditions abate, as by a general fall in temperature, the column may also brake off and be injested by the engine. But this is not a difficulty because the column is sufficiently small. In a typical experiment a cone angle $\alpha$ of 45° with a semi-spherical tip having a radius of 2 mm gave rise to column of ice weighing only 50 gram. This distinguised from a column weighing 400 grams in a comparable conventional engine.

The part 20 may have an angle between 30° and 60°, preferably between 40 and 50°. The circular downstream end or base, denoted 20B, of the part 20 should have a diameter which is less than 50% and may be 30 to 40%, of the diameter of the hub as measured at the junction, denoted 22A, between the surface of the hub 17 and the part 22. The junction, denoted 21A, between the parts 21,22 may lie on a diameter which is between 60 and 70% of the diameter of the junction 22A.

The engine is intended for flight at subsonic speeds. Accordingly the nose is situated within the intake 11, i.e. downstream of a line 11A defining the plane of the entry lip 11B of the intake. The compressor may be said to adjoin the intake substantially at the plane of the junction 22A. The nose 19 is regarded as a part of the compressor because it is a part of the rotating structure of the compressor although, aerodynamically, the nose is a part of the intake, i.e. it defines the radially inner boundary of the intake passage.

I claim:

1. Gas turbine engine comprising an air intake duct, a compressor duct, a compressor having a rotor hub defining the radially inner surface of the compressor duct, the hub having at the upstream end thereof a nose whereby, in operation, to divide a stream of air entering the intake duct and spreading said stream outwardly toward said hub surface, said nose being secured to said hub and being rotatable therewith, said nose comprising an upstream part having a conical surface defining a pointed upstream end and a circular downstream end whose diameter is substantially less than that of said hub, said nose further comprising an intermediate part defining a concave surface of revolution contiguous with the upstream part and a downstream part defining a convex surface of revolution arranged contiguously between the intermediate part and said hub.

2. Gas turbine according to claim 1, wherein the upstream end part has a cone angle of between 30° and 60°.

3. Gas turbine engine according to claim 2, wherein said cone angle is between 40° and 50°.

4. Gas turbine engine according to claim 1, wherein the diameter of the downstream end of the first nose part is less than 50% of the diameter of the hub.

5. Gas turbine engine according to claim 1 wherein the diameter of the downstream end of the first nose part is between 30 and 40% of the diameter of the hub.

6. Gas turbine engine according to claim 5 wherein the diameter of the junction between said second and third parts of the nose is between 60 and 70% of the diameter of the hub.

* * * * *